May 1, 1928.  
P. HENZE  
1,667,934  
PISTON SUPPORTING DEVICE  
Filed Jan. 28, 1927
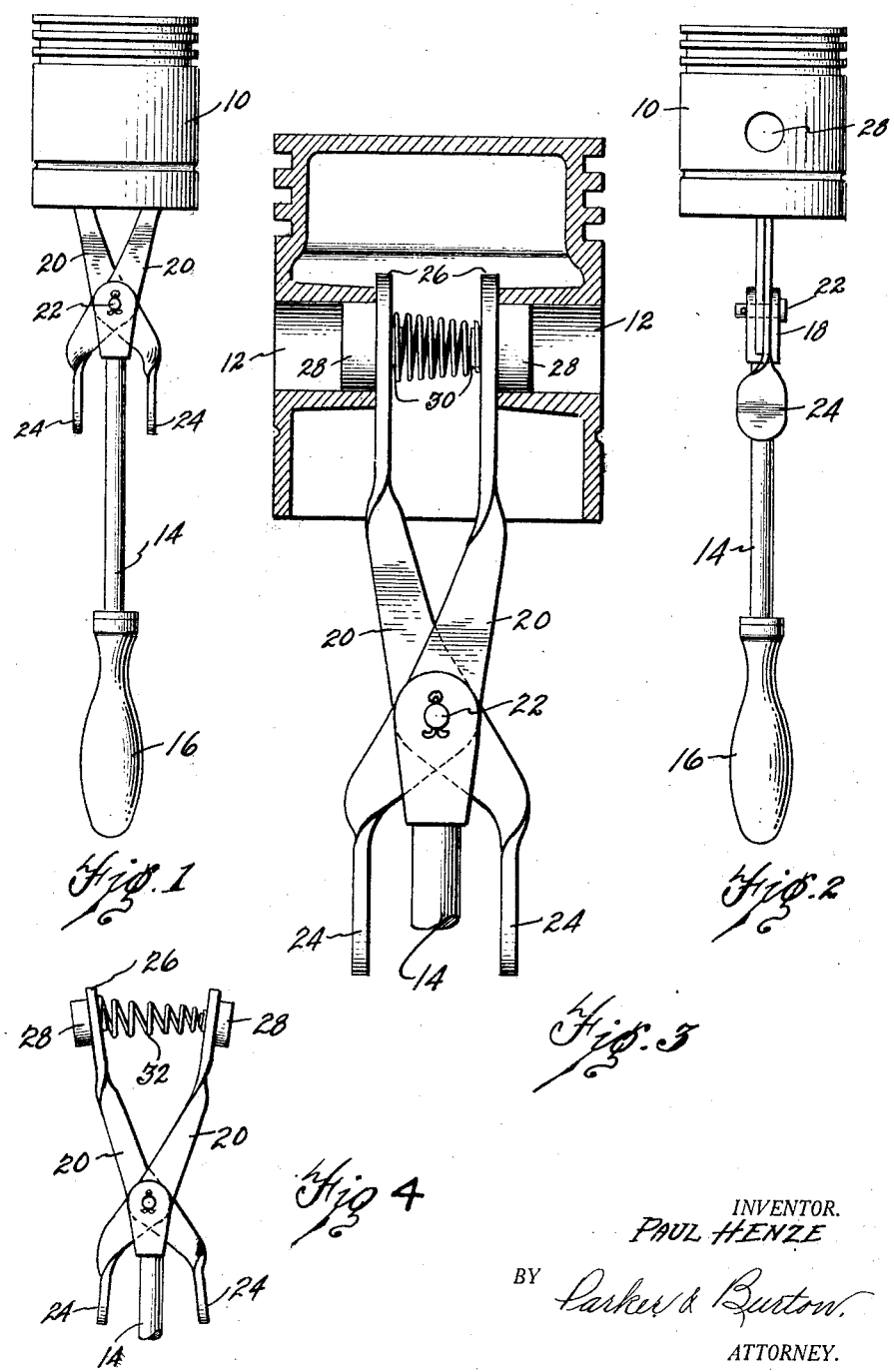
INVENTOR.  
PAUL HENZE  
BY Parker & Burton  
ATTORNEY.

Patented May 1, 1928.

1,667,934

UNITED STATES PATENT OFFICE.

PAUL HENZE, OF DETROIT, MICHIGAN.

PISTON-SUPPORTING DEVICE.

Application filed January 28, 1927. Serial No. 164,190.

My invention relates to an improved piston supporting device or tool adapted to be inserted within a piston to automatically releasably engage in the pin bearings thereof to support the piston for manipulation within a cylinder bore, particularly in the taking of measurements concerning the fit of the piston within a cylinder during the reboring thereof.

Present day development of the internal-combustion engine in the automotive field is toward the use of pistons of increasingly smaller diameter. The use of such pistons makes it difficult to support the piston at adjusted positions throughout the length of the bore of its cylinder to measure the clearance between the piston and the cylinder during the reboring of the cylinder. My improved tool is intended to be used to support the piston within the cylinder at any position throughout the length of the cylinder and to leave sufficient room for the insertion of feelers to take measurements between the piston and the wall of the cylinder.

The device illustrated is simple, inexpensive, easily operable, and adaptable for use with pistons of different diameters.

Various other objects and meritorious features of my invention will more fully appear from the following specification, appended claims, and accompanying drawing wherein:

Fig. 1 is a side elevation of my improved device in use;

Fig. 2 is an other side elevation of my improved device in use, taken at a right angle to the view in Fig. 1;

Fig. 3 is a fragmentary elevation of my improved device in use, showing the piston in cross section; and Fig. 4 is a fragmentary elevation of my improved device when not in use.

In the drawing let 10 indicate a piston provided with opposed pin bearings 12.

My improved tool comprises a handle 14 provided at one end with a hand grip portion 16 and at the opposite end with a fork 18. There is pivotally articulated to the forked end of the arm a piston supporting mechanism comprising a pair of crossed piston supporting members or arms 20. These arms are pivotally supported within the bifurcation 18 at their crossing point and intermediate their ends upon a pin 22.

Each arm is so shaped that it is provided at each end with a flattened portion. The flattened portions at the inner ends of the arms are indicated as 24 and are adapted to be engaged by the hand of the operator to manipulate the arms. The flattened face portions at the outer ends of the arms are indicated as 26. There is provided a pair of opposed supporting bearings 28, one formed upon the outer face of each flattened face 26. These bearings 28 are in the form of annular lugs adapted to be received within the pin bearings 12 of the piston 10 to support the piston. These bearings are here shown as provided with extensions 30 projecting through the arms and beyond the inner faces thereof. An expansion spring 32 is positioned between the arms seated upon the projecting lugs 30 as illustrated to normally yieldingly hold the arms apart.

Through manipulation of the arms 20 it is possible to position the bearings 28 within the pin bearings 12 of any piston and thereby support the piston for manipulation within the cylinder bore. It is noted that the supporting device is so pivotally articulated that the piston has to be swung to one side thereof practically any direction due to the fact that the device itself is pivotally connected with the piston by the mounting of the bearing supports 28 within the pin bearings 12 and the pivotal articulation of the handle with the arms of the piston supporting mechanism.

What I claim is:

1. In an instrument of the class described, a handle having a hand grip portion at one end and a fork at the opposite end, a pair of crossed arms pivotally supported at their crossing point and intermediate their ends within said fork, each arm provided at its outer end with a laterally projecting annular bearing lug, and a spring between the outer ends of the arms holding them yieldingly apart.

2. In an instrument of the class described, a handle having a hand grip portion at one end and a fork at the opposite end. a pair of crossed arms pivotally supported at their crossing point within said fork, an expansion spring between the outer ends of said arms holding them yieldingly apart, a pair of opposed outwardly projecting bearing supports, one upon each arm adapted to engage within a bearing to support the same.

3. In an article of the class described, a handle provided at one end with a pair of pivotally supported crossed arms, said arms provided at one end with corresponding outwardly projecting annular bearings and at the opposite end with hand grip portions, means holding the bearing ends of said arms yieldingly apart.

4. In an article of the class described, a handle, piston supporting means at one end of the handle comprising a pair of opposed supporting bearings and means holding said supporting bearings yieldingly apart.

5. In a device adapted for insertion within a piston to releasably engage the opposed pin bearings thereof, a handle, a piston supporting mechanism carried thereby comprising a pair of supporting bearing members receivable within the pin bearings of the piston, and resilient means holding said supporting bearing members normally apart to engage within the opposed pin bearings of the piston.

6. In a device of the class described, a handle provided at one end with a fork, a pair of crossed arms pivotally supported intermediate therein and at their crossing point within said fork, each end of said arm provided with an outwardly flat face, a pair of annular bearings formed on the flattened faces of the outer ends of said arms one on each flattened face on the outer side thereof, each bearing provided with a lug extending through said arm and projecting inwardly on the inner side thereof, and an expansion spring between the outer ends of said arms seated over said lugs.

7. A device of the class described comprising a handle, a pair of arms pivoted to the handle, each arm provided with an outwardly flat face having an annular bearing secured thereon provided with a lug extending through the arm, and a spring between said arms seated over said lugs.

In testimony whereof, I, PAUL HENZE, sign this specification.

PAUL HENZE.